(12) United States Patent
Sivabalan et al.

(10) Patent No.: US 12,058,026 B2
(45) Date of Patent: Aug. 6, 2024

(54) SEGMENT ROUTING TRAFFIC ENGINEERING (SR-TE) WITH AWARENESS OF LOCAL PROTECTION

(71) Applicant: Ciena Corporation, Hanover, MD (US)

(72) Inventors: Muthurajah Sivabalan, Ottawa (CA); Sami Boutros, Union City, CA (US); Cengiz Alaettinoglu, Sherman Oaks, CA (US)

(73) Assignee: Ciena Corporation, Hanover, MD (US)

( * ) Notice: Subject to any disclaimer, the term of this patent is extended or adjusted under 35 U.S.C. 154(b) by 382 days.

(21) Appl. No.: 17/017,805

(22) Filed: Sep. 11, 2020

(65) Prior Publication Data
US 2022/0086078 A1    Mar. 17, 2022

(51) Int. Cl.
*H04L 45/12* (2022.01)
*H04L 45/00* (2022.01)
*H04L 45/24* (2022.01)

(52) U.S. Cl.
CPC .............. *H04L 45/12* (2013.01); *H04L 45/24* (2013.01); *H04L 45/34* (2013.01)

(58) Field of Classification Search
CPC ......... H04L 45/12; H04L 45/24; H04L 45/34; H04L 45/247; H04L 45/26; H04L 69/40; H04L 45/22; H04L 47/728; H04L 45/28
See application file for complete search history.

(56) References Cited

U.S. PATENT DOCUMENTS

| | | |
|---|---|---|
| 8,295,278 B2 | 10/2012 | Shah et al. |
| 8,948,055 B2 | 2/2015 | Bragg |
| 9,531,627 B1 | 12/2016 | Alvarez et al. |
| 9,538,423 B2 | 1/2017 | Alvarez et al. |
| 9,660,897 B1 * | 5/2017 | Gredler .................. H04L 45/50 |
| 9,979,629 B2 | 5/2018 | Sivabalan et al. |
| 10,069,639 B2 | 9/2018 | Bragg et al. |

(Continued)

OTHER PUBLICATIONS

C. Filsfils et al., Spring Internet-Draft, Standards Track, Expires: Aug. 28, 2020, Network Programming extension: SRv6 uSID instruction draft-filsfils-spring-net-pgm-extension-srv6-usid-04, Feb. 25, 2020, pp. 1-14.

(Continued)

*Primary Examiner* — Atique Ahmed
(74) *Attorney, Agent, or Firm* — Baratta Law PLLC; Lawrence A. Baratta, Jr.

(57) ABSTRACT

Systems and methods for Segment Routing Traffic Engineering (SR-TE) with awareness of local protection include the advertisement of local protection information in effect at each SR capable node via Interior Gateway Protocol (IGP), Border Gateway Protocol Link-State advertisement (BGP-LS), telemetry, etc. This information can include identity (IP address) of protected elements (link/node), type of protection (node, link, SRLG), a SID list for the backup path, whether protection is active, etc. This information can also be advertised via Path Computation Element Protocol (PCEP) as well. The information can also include a Binding SID (BSID) in the advertisement for local backup paths. Further, the present disclosure can enable a new SR OAM message (probe) to instruct a node to activate/deactivate a specific backup path in the forwarding plane for testing purposes.

20 Claims, 7 Drawing Sheets

(56) References Cited

U.S. PATENT DOCUMENTS

| | | |
|---|---|---|
| 10,153,948 B2 | 12/2018 | Ong |
| 10,250,494 B2 | 4/2019 | Sivabalan et al. |
| 10,263,881 B2* | 4/2019 | Psenak .................. H04L 45/02 |
| 11,184,276 B1* | 11/2021 | Boutros ................. H04L 45/50 |
| 2008/0107416 A1* | 5/2008 | Wang ................... H04L 12/437 398/59 |
| 2012/0030750 A1* | 2/2012 | Bhargava ............... H04L 63/02 726/13 |
| 2014/0029418 A1* | 1/2014 | Jain ........................ H04L 45/28 370/228 |
| 2014/0269266 A1* | 9/2014 | Filsfils ................... H04L 45/22 370/228 |
| 2015/0109902 A1* | 4/2015 | Kumar ................... H04L 45/22 370/219 |
| 2015/0186202 A1* | 7/2015 | Wang ................. G06F 11/0772 714/57 |
| 2015/0288602 A1 | 10/2015 | Bragg et al. |
| 2016/0119821 A1* | 4/2016 | Ramachandran ..... H04L 45/026 370/392 |
| 2016/0380886 A1 | 12/2016 | Blair et al. |
| 2018/0077051 A1* | 3/2018 | Nainar .................. H04L 45/745 |
| 2018/0359176 A1* | 12/2018 | Nainar .................... H04L 45/34 |
| 2019/0132221 A1 | 5/2019 | Boutros et al. |
| 2019/0245787 A1 | 8/2019 | Skalecki et al. |
| 2020/0366763 A1* | 11/2020 | Bonica ................ H04L 12/4633 |
| 2021/0014146 A1* | 1/2021 | Chen ....................... H04L 45/28 |
| 2021/0144086 A1* | 5/2021 | Bidgoli ................. H04L 47/125 |

OTHER PUBLICATIONS

C. Filsfils et al., Spring Internet-Draft, Standards Track, Expires: Aug. 26, 2020, SRv6 Network Programming draft-ietf-spring-srv6-network-programming-10, Feb. 23, 2020, pp. 1-38.

A. Sajassi et al., Internet Engineering Task Force (IETF), Category: Informational, ISSN: 2070-1721, Requirements for Ethernet VPN (EVPN), May 2014, pp. 1-15.

A. Sajassi et al., Internet Engineering Task Force (IETF), Category: Standards Track, ISSN: 2070-1721, A Network Virtualization Overlay Solution Using Ethernet VPN (EVPN), Mar. 2018, pp. 1-33.

J. Rabadan et al., Internet Engineering Task Force (IETF), Category: Standards Track, ISSN: 2070-1721, Framework for Ethernet VPN Designated Forwarder Election Extensibility, Apr. 2019, pp. 1-32.

* cited by examiner

SEGMENT ROUTING TRAFFIC ENGINEERING (SR-TE) WITH AWARENESS OF LOCAL PROTECTION

FIELD OF THE DISCLOSURE

The present disclosure generally relates to networking. More particularly, the present disclosure relates to systems and methods for Segment Routing Traffic Engineering (SR-TE) with awareness of local protection.

BACKGROUND OF THE DISCLOSURE

In Segment Routing, a head-end node or PCE chooses a path, and the head-end node encodes the chosen path in a packet header as an ordered list of segments. In Segment Routing, Topology-Independent Loop-Free Alternate (TI-LFA) provides local protection against link failure, node failure, etc. For a link failure, the destination is protected if the link fails. For a node failure, the destination is protected if a neighbor connected to the link fails. Conventionally, Interior Gateway Protocol (IGP) and Border Gateway Protocol Link-State advertisement (BGP-LS) are capable of advertising if a link "can" be protected via TI-LFA, but this does not include additional information required to compute a path using link(s)/node(s) that have guaranteed local protection of the desired type. Also, with conventional approaches, the determination of a Maximum Segment Depth (MSD) value for a head-end node that guarantees local protection during a local failure is not feasible. Also, conventionally, SR Operations, Administration, and Maintenance (OAM) enables probing paths, but SR OAM does not enable probing local backup paths for local protection. That is, a head-end node or PCE, conventionally, may know that a path supports local protection, but that is the extent of their knowledge. The head-end node or PCE, conventionally, does not have additional information for local protection such as a number of local protection routes, type of local protection, identification of the protected elements (link/node), etc.

BRIEF SUMMARY OF THE DISCLOSURE

The present disclosure relates to systems and methods for Segment Routing Traffic Engineering (SR-TE) with awareness of local protection. Specifically, the present disclosure includes the advertisement of local protection information in effect at each SR capable node via IGP (OSPF, ISIS), BGP-LS, telemetry, etc. This information can include identity (IP address) of protected elements (link/node), type of protection (node, link, SRLG), a SID list for a backup path, whether protection is active, etc. This information can also be advertised via the Path Computation Element Protocol (PCEP) as well. The information can also include a Binding SID (BSID) in the advertisement for local backup paths. Further, the present disclosure can enable a new SR OAM message (probe) to instruct a node to activate/deactivate a specific backup path in the forwarding plane for testing purposes. That is, a head-end node now knows the specific local protection backs and their BSID and can test the availability by injecting a probe packet with the appropriate BSID for the local backup path. Advantageously, the present disclosure enables SR-TE paths with a Service Level Agreement (SLA) with guaranteed local protection. For example, a customer can be assigned a path with a guaranteed level of local protection, including latency and paths with multiple local protection paths. Also, the present disclosure enables the testing of backup paths to detect faulty backup paths before network failure automatically.

In an embodiment, a method includes steps, a node is configured to implement steps, and a non-transitory computer-readable medium includes instructions stored thereon for programming a device to perform the steps. The steps include obtaining advertisement information from a plurality of nodes in a Segment Routing network, wherein the advertisement information relates to local protection at a corresponding node and includes any of addresses for links and/or nodes in the local protection, a type of the local protection, and a Segment Identifier (SID) list for each local backup path in the local protection; storing the advertisement information locally; and computing a path in the Segment Routing network based in part on available local protection on the path utilizing the stored advertisement information. The steps can further include probing a local backup path utilizing the stored advertisement information including a SID for the local backup path.

The advertisement information can be obtained via one of an Interior Gateway Protocol and Border Gateway Protocol Link-State advertisement. The advertisement information can be obtained via Path Computation Element Protocol. The advertisement information can include one or more Binding SIDs for associated local backup paths. The path can be computed to satisfy Maximum Segment Depth (MSD) value constraints at a head-end node. The path can be computed in part based on having one of a maximum number of local backup paths and a maximum degree of guaranteed local protection. The steps can further include sending a message to a head-end node of an underlay path to instruct the head-end node to activate a local backup path.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Again, the present disclosure relates to systems and methods for Segment Routing Traffic Engineering (SR-TE)

with awareness of local protection. Specifically, the present disclosure includes the advertisement of local protection information in effect at each SR capable node via IGP (OSPF, ISIS), BGP-LS, telemetry, etc. This information can include identity (IP address) of protected elements (link/node), type of protection (node, link, SRLG), a SID list for a backup path, whether protection is active, etc. This information can also be advertised via the Path Computation Element Protocol (PCEP) as well. The information can also include a Binding SID (BSID) in the advertisement for local backup paths. Further, the present disclosure can enable a new SR OAM message (probe) to instruct a node to activate/deactivate a specific backup path in the forwarding plane for testing purposes. That is, a head-end node now knows the specific local protection backs and their BSID and can test the availability by injecting a probe packet with the appropriate BSID for the local backup path. Advantageously, the present disclosure enables SR-TE paths with a Service Level Agreement (SLA) with guaranteed local protection. For example, a customer can be assigned a path with a guaranteed level of local protection, including latency and paths with multiple local protection paths. Also, the present disclosure enables the testing of backup paths to detect faulty backup paths before network failure automatically.

Acronyms

The following acronyms, abbreviations, and definitions are utilized herein:

| | |
|---|---|
| BSID | Binding SID |
| BGP | Border Gateway Protocol |
| BGP-LS | Border Gateway Protocol Link-State advertisement |
| CSPF | Constrained Shortest Path First |
| IGP | Interior Gateway Protocol (e.g., ISIS, OSPF) |
| IP | Internet Protocol |
| ISIS | Intermediate System-Intermediate System |
| MPLS | Multiprotocol Label Switching |
| MSD | Maximum Segment Depth |
| OAM | Operations, Administration, and Maintenance |
| OSPF | Open Shortest Path First |
| PCE | Path Computation Element |
| PCEP | Path Computation Element Protocol |
| SID | Segment Identifier |
| SLA | Service Level Agreement |
| SR | Segment Routing |
| SRLG | Shared Risk Link Group |
| SR-TE | Segment Routing-Traffic Engineering |
| TI-LFA | Topology-Independent Loop-Free Alternate |

Segment Routing Overview

Segment Routing (SR) is a technology that implements a source routing paradigm. A packet header includes a stack of function identifiers, known as segments, which define an ordered list of functions to be applied to the packet. A segment can represent any instruction, topological, or service-based. A segment can have a local semantic to an SR node or global within an SR domain. These functions include, but are not limited to, the forwarding behaviors to apply successively to the packet, notably destination-based unicast forwarding via a sequence of explicitly enumerated nodes (domain-unique node segments) and links (adjacency segments), and the like. SR allows forcing a flow through any topological path and service chain while maintaining a per-flow state only at the ingress node to the SR domain. Segment Routing is described, e.g., in Fiflsfils et al., RFC 8402, "Segment Routing Architecture," Internet Engineering Task Force (IETF), July 2018, the contents of which are incorporated herein by reference. A particular attraction of Segment Routing is that it obviates the need to install and maintain any end-to-end (e2e) path state in the core network. Only the ingress node for a particular flow needs to hold the segment stack, which is applied as the header of every packet of that flow, to define its route through the network. This makes Segment Routing particularly suited to control by a Software-Defined Networking (SDN) model.

Segment Routing can be directly applied to Multiprotocol Label Switching (MPLS) with no change in the forwarding plane. A segment is encoded as an MPLS label. An ordered list of segments is encoded as a stack of labels. The segment to process is on the top of the stack. Upon completion of a segment, the related label is popped from the stack. Segment Routing can also be applied to the Internet Protocol (IP) v6 architecture, with a new type of routing extension header—for example, the document published in July 2015 as draft-previdi-6man-segment-routing-header (available online at tools.ietforg/html/draft-previdi-6man-segment-routing-header-08). A segment is encoded as an IPv6 address. An ordered list of segments is encoded as an ordered list of IPv6 addresses in the routing extension header. The Segment to process at any point along the path through the network is indicated by a pointer in the routing extension header. Upon completion of a segment, the pointer is incremented. Segment Routing can also be applied to Ethernet, e.g., IEEE 802.1 and variants thereof. There are various benefits asserted for SR, including, for example, scalable end-to-end policy, easy incorporation in IP and SDN architectures, operational simplicity, a balance between distributed intelligence, centralized optimization, and application-based policy creation, and the like.

In loose source routing such as Segment Routing, a source node chooses a path and encodes the chosen path in a packet header as an ordered list of segments. The rest of the network executes the encoded instructions without any further per-flow state. Segment Routing provides full control over the path without the dependency on network state or signaling to set up a path. This makes Segment Routing scalable and straightforward to deploy. Segment Routing (SR) natively supports both IPv6 (SRv6) and MPLS (SR-MPLS) forwarding planes and can co-exist with other transport technologies, e.g., Resource Reservation Protocol (RSVP)-Traffic Engineering (RSVP-TE) and Label Distribution Protocol (LDP).

In Segment Routing, a path includes segments which are instructions a node executes on an incoming packet. For example, segments can include forward the packet according to the shortest path to the destination, forward through a specific interface, or deliver the packet to a given application/service instance). Each Segment is represented by a Segment Identifier (SID). All SIDs are allocated from a Segment Routing Global Block (SRGB) with domain-wide scope and significance, or from a Segment Routing Local Block (SRLB) with local scope. The SRGB includes the set of global segments in the SR domain. If a node participates in multiple SR domains, there is one SRGB for each SR domain. In SRv6, the SRGB is the set of global SRv6 SIDs in the SR domain.

A segment routed path is encoded into the packet by building a SID stack that is added to the packet. These SIDs are popped by processing nodes, and the next SID is used to decide forwarding decisions. A SID can be one of the following types an adjacency SID, a prefix SID, a node SID, a binding SID, and an anycast SID. Each SID represents an associated segment, e.g., an adjacency segment, a prefix segment, a node segment, a binding segment, and an anycast segment.

An adjacency segment is a single-hop, i.e., a specific link. A prefix segment is a multi-hop tunnel that can use equal-cost multi-hop aware shortest path links to reach a prefix. A prefix SID can be associated with an IP prefix. The prefix SID can be manually configured from the SRGB and can be distributed by ISIS or OSPF. The prefix segment steers the traffic along the shortest path to its destination. A node SID is a special type of prefix SID that identifies a specific node. It is configured under the loopback interface with the loopback address of the node as the prefix. A prefix segment is a global segment, so a prefix SID is globally unique within the segment routing domain. An adjacency segment is identified by a label called an adjacency SID, which represents a specific adjacency, such as egress interface, to a neighboring router. The adjacency SID is distributed by ISIS or OSPF. The adjacency segment steers the traffic to a specific adjacency.

A binding segment represents an SR policy. A head-end node of the SR policy binds a Binding SID (BSID) to its policy. When the head-end node receives a packet with an active segment matching the BSID of a local SR Policy, the head-end node steers the packet into the associated SR Policy. The BSID provides greater scalability, network opacity, and service independence. Instantiation of the SR Policy may involve a list of SIDs. Any packets received with an active segment equal to BSID are steered onto the bound SR Policy. The use of a BSID allows the instantiation of the policy (the SID list) to be stored only on the node or nodes that need to impose the policy. The direction of traffic to a node supporting the policy then only requires the imposition of the BSID. If the policy changes, this also means that only the nodes imposing the policy need to be updated. Users of the policy are not impacted. The BSID can be allocated from the local or global domain. It is of special significance at the head-end node where the policy is programmed in forwarding.

SR Traffic Engineering (SR-TE) provides a mechanism that allows a flow to be restricted to a specific topological path, while maintaining per-flow state only at the ingress node(s) to the SR-TE path. It uses the Constrained Shortest Path First (CSPF) algorithm to compute paths subject to one or more constraint(s) (e.g., link affinity) and an optimization criterion (e.g., link latency). An SR-TE path can be computed by a head-end of the path whenever possible (e.g., when paths are confined to single IGP area/level) or at a Path Computation Element (PCE) (e.g., when paths span across multiple IGP areas/levels).

Local Protection Overview

SR also provides local protection via a mechanism called TI-LFA in which IGPs (OSPF, ISIS) compute a backup path for local failure. The type of local protection can be link, node, SRLG, and node plus SRLG. TI-LFA provides a 50 ms traffic loss/restoration guarantee. Also, other techniques for providing a local backup path for a local failure is possible in SR architecture. As described herein, local protection is any protection in SR where a failure is addressed locally instead of via a head-end node or PCE.

Customers, particularly those dealing with mobile or financial data traffic as an example, often demand a low latency path with minimal disruption of services due to network failures. With SR-TE, when a network element (link/node) fails, a head-end or PCE learns about the failure via IGP/BGP-LS, re-computes paths excluding the failed network element, and installs the new paths (i.e., re-optimized paths). However, because of the reliance on routing updates, this approach cannot always provide a 50 ms loss guarantee, especially in large scale deployments where a large number of SR-TE paths need to be re-optimized due to a failure. On the other hand, by using local protection (such as TI-LFA) as the first line of defense for SR-TE paths followed by the installation of re-optimized paths computed by the head-end or PCE after routing updates are received, an operator can provide 50 ms loss guarantee due to network element failure without steering traffic on sub-optimal paths for a long time.

Figure 1:
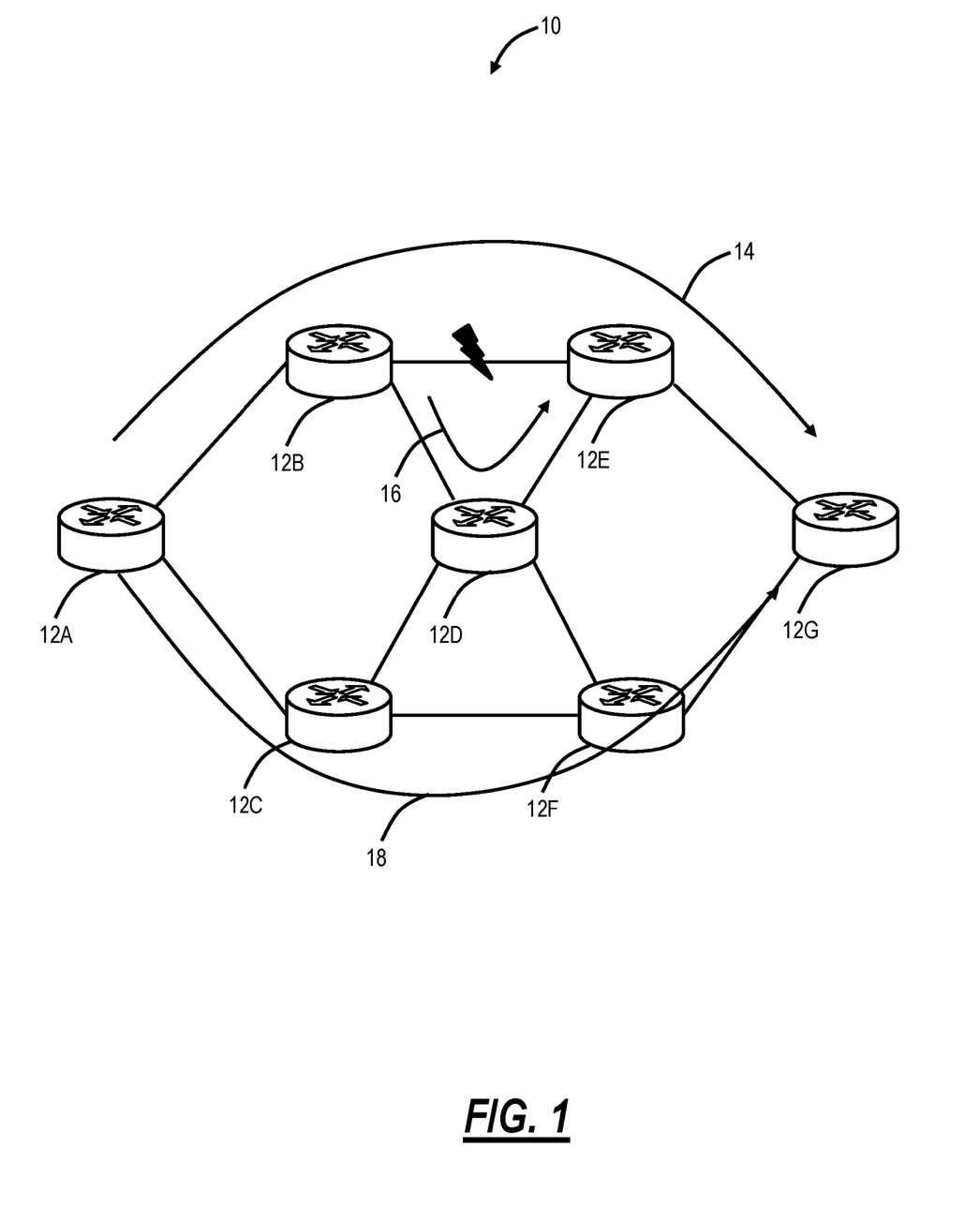
FIG. 1 is a network diagram of an SR network with various interconnected nodes for illustrating local protection.

FIG. 1 is a network diagram of an SR network 10 with various interconnected nodes 12 (labeled nodes 12A-12G) for illustrating local protection. In this example, there is a primary path 14 for a service with a node 12A being the head-end. The primary path 14 includes the nodes 12A, 12B, 12E, 12G. For example, there can be a link failure between the nodes 12B, 12E, and there can be local protection, which reroutes the service on a local backup path 16 between the nodes 12B, 12D, 12E. This local protection can be the first line of defense. Subsequently, the head-end or PCE can compute a new primary path 18. Also, those skilled in the art will appreciate the SR network 10 is just one example for illustration purposes and other SR networks are also contemplated.

Motivation

With the current SR architecture (defined by corresponding RFCs/drafts), the head-end node 12A or a PCE is unable to compute SR-TE paths that guarantee (1) local backup paths exist for every single link/node on the path, and (2) local backup paths have the desired types of protection (e.g., link, node, SRLG, etc.). Simply put, this information is unavailable to the head-end node 12 or PCE. Also, an OAM tool cannot probe the local backup paths to make sure they are ready to carry traffic in case of failure, since, again, this information is unavailable to the head-end node 12 or the PCE.

The present disclosure addresses this shortcoming by providing this information to the head-end node 12 or PCE. A network operator can provide the desired level of SLA to customers carrying loss-sensitive traffic. The proposed solution addresses these shortcomings using extensions to SR architecture and routing protocols.

Local Detection Process

Figure 2:
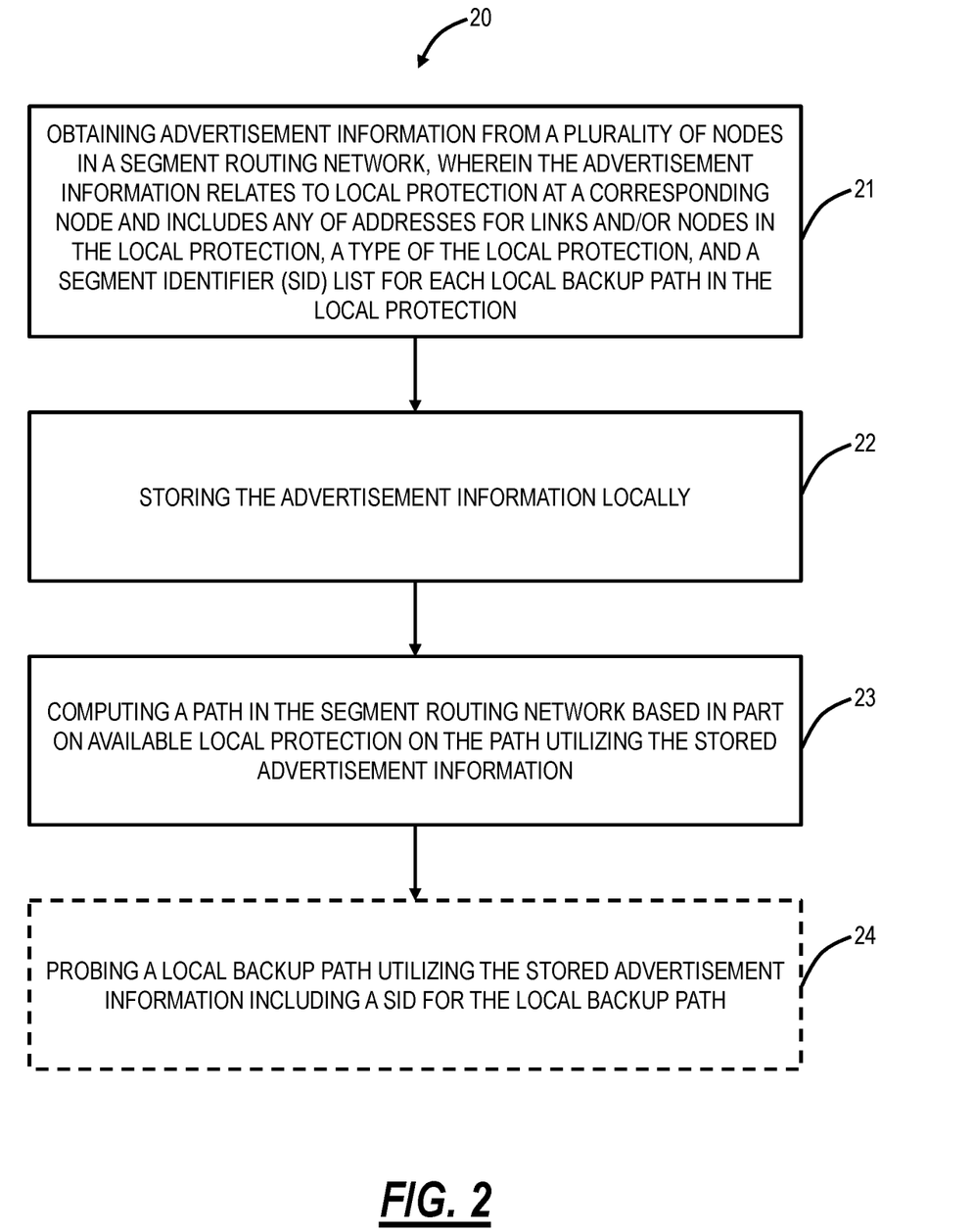
FIG. 2 is a flowchart of a local protection process implemented with the SR network of FIG. 1.

FIG. 2 is a flowchart of a local protection process 20 implemented with the SR network 10. The local detection process 20 can be implemented by a head-end node or by a PCE. Also, the local detection process 20 can be a method, instructions that cause a device to implement steps with the instructions stored in a non-transitory computer readable medium, and via an apparatus such as the head-end node or the PCE.

The local detection process 20 includes obtaining advertisement information from a plurality of nodes in a Segment Routing network, wherein the advertisement information relates to local protection at a corresponding node and includes any of addresses for links and/or nodes in the local protection, a type of the local protection, and a Segment Identifier (SID) list for each local backup path in the local protection (step 21); storing the advertisement information locally (step 22); and computing a path in the Segment Routing network based in part on available local protection on the path utilizing the stored advertisement information (step 23). The local detection process 20 can also include probing a local backup path utilizing the stored advertisement information, including a SID for the local backup path (step 24).

In the local detection process 20, each node 12 advertises information about the pre-determined local protection it provides to the attached link(s) or neighbor node(s). Such information can include the address of the protected node(s)/link(s), type of protection (node, link, SRLG), and a SID list required for each local backup paths. Thus, a head-end node or PCE has sufficient information to compute paths consisting of node(s)/link(s) that have or better still the desired level of local protection. For example, in FIG. 1, the node 12B could advertise local protection for the link between the nodes 12B, 12E as a local backup path between the nodes 12B, 12D, 12E along with a BSID based thereon. Also, in another example, the node 12B could advertise local protection for the node 12B as a local backup path between the nodes 12A, 12C, 12D, 12E along with a BSID based thereon.

With the local detection process 20, because local protection information at head-end is available, a head-end node or PCE can compute paths that are guaranteed to satisfy MSD constraints at the head-end node before as well as after a local failure. Also, with the local detection process 20, operators can probe any local backup paths to ensure that they are healthy in the data plane.

If a head-end node or PCE is aware of the availability of local protection (i.e., if a node or link is actually protected) as well as the type (link, node, SRLG) of protection, it can compute SR-TE paths via links and nodes which have guaranteed local protection as well as the desired protection type. For example, a PCE can prefer a path with node protection as opposed to link protection for SR-TE paths.

The local detection process 20 extends the SR-TE architecture to allow each node to advertise the local protection information for its neighboring nodes and/or attached links. To support local protection, a node can include an additional SID list on the packet. The maximum number of SIDs that can be imposed by an SR-capable node is called "Maximum SID Depth" (MSD), and can be constrained by a node's hardware capability. Depending on the network topology and the type of protection, the SID list could be larger than the repair node's MSD. As such, a node may provide protection with a different type (e.g., link protection as opposed to SRLG protection) or no protection at all. The local detection process 20 enables a node to advertise the following information to head-end (for head-end computed paths) via IGP or to PCE (for PCE computed paths) via IGP/BGP-LS or telemetry:

Identity of the protected element (e.g., a protected node can be identified by its IP address);
Type of protection (e.g., link, node, SRLG, etc.); and
Size of the SID list to be imposed for the backup path.

Moreover, SR-TE paths must be computed considering MSD of the head-end node. The MSD must also factor in the additional SID(s) to be imposed at a head-end node following a local link failure. Again, with the local detection process 20, a head-end or PCE can accurately determine the MSD taking into consideration the local protection available at head-end. Currently, PCEP signals a single MSD to the head-end, see RFC 8664, "Path Computation Element Communication Protocol (PCEP) Extensions for Segment Routing," December 2019, the contents of which are incorporated by reference herein. The present disclosure can extend PCEP to advertise additional local protection information mentioned above for the head-end node.

SID for Local Backup Path

Operators want to ensure that the local backup path(s) are correctly programmed and ready to carry traffic in the forwarding plane for OAM purposes. Thus, the present disclosure includes additions to the SR OAM portfolio. First, each node allocates a Binding SID (BSID) for each backup path and can advertise that BSID as part of local backup information. So, if a packet whose topmost SID is a BSID X associated with the backup path Y, the packet is steered over that backup path. Using this information, a diagnostic tool can send OAM probe packets to ensure that traffic is forwarded over a specific backup path. This provides a non-intrusive diagnostics of backup paths because the backup paths do not have to be activated in the forwarding plane.

Second, a new OAM message is introduced to instruct a given node to activate a backup path in the forwarding plane as if the protected network element in question has failed. Once the backup is activated in the forwarding plane, a diagnostic tool can send probe packets to ensure that the backup paths are active. This is an intrusive approach because, during the test, user traffic is also steered over the backup under test. This approach can be used to quantify the time it takes for a node to re-direct traffic over a local backup path once it detects a node/link failure.

Use Case 1: SR-TE Paths with a High Degree of Local Protection

Figure 3:
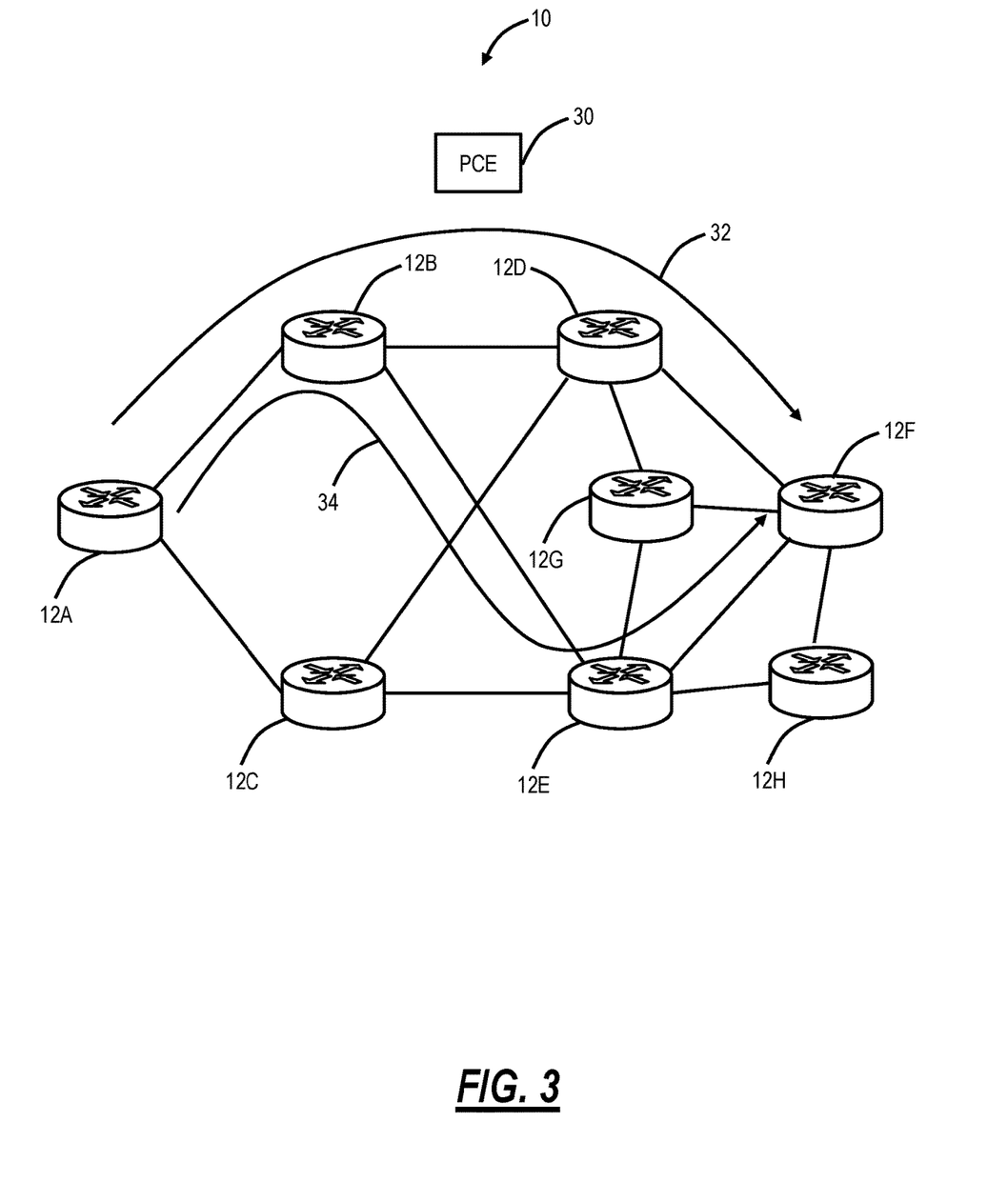
FIG. 3 is a network diagram of the SR network with various interconnected nodes for illustrating the use case of SR-TE paths with a high degree of local protection.

FIG. 3 is a network diagram of the SR network 10 with various interconnected nodes 12 (labeled nodes 12A-12H) for illustrating the use case of SR-TE paths with a high degree of local protection. In this example, in the absence of local protection information, i.e., the conventional approach, an optimal SR-TE path 32 from nodes 12A, 12F is computed by the head-end node 12A or a PCE 30 is between nodes 12A, 12B, 12D, 12F. However, the SR-TE path 32 only has a single backup for the link between the nodes 12D, 12F. With the availability of local protection information, the head-end node 12A or PCE 30 can choose a path 34 that traverses the nodes 12A, 12B, 12E, 12F, which provides a higher degree of local protection for a given network state. Both the paths 32, 34 share the node 12B and note that the node 12A provides node protection for the node 12B. The nodes 12D, 12E also provide link protection for the links between the nodes 12D, 12F and the nodes 12E, 12F, respectively. However, the node 12E has multiple local backups, so this may be the preferred path. The objective is to expose local protection information to the element computing path (head-end node 12A or PCE 30) so that path with a high degree of local protection can be computed.

Use Case 2: Proper MSD Evaluation at SR-TE Head-End

Figure 4:
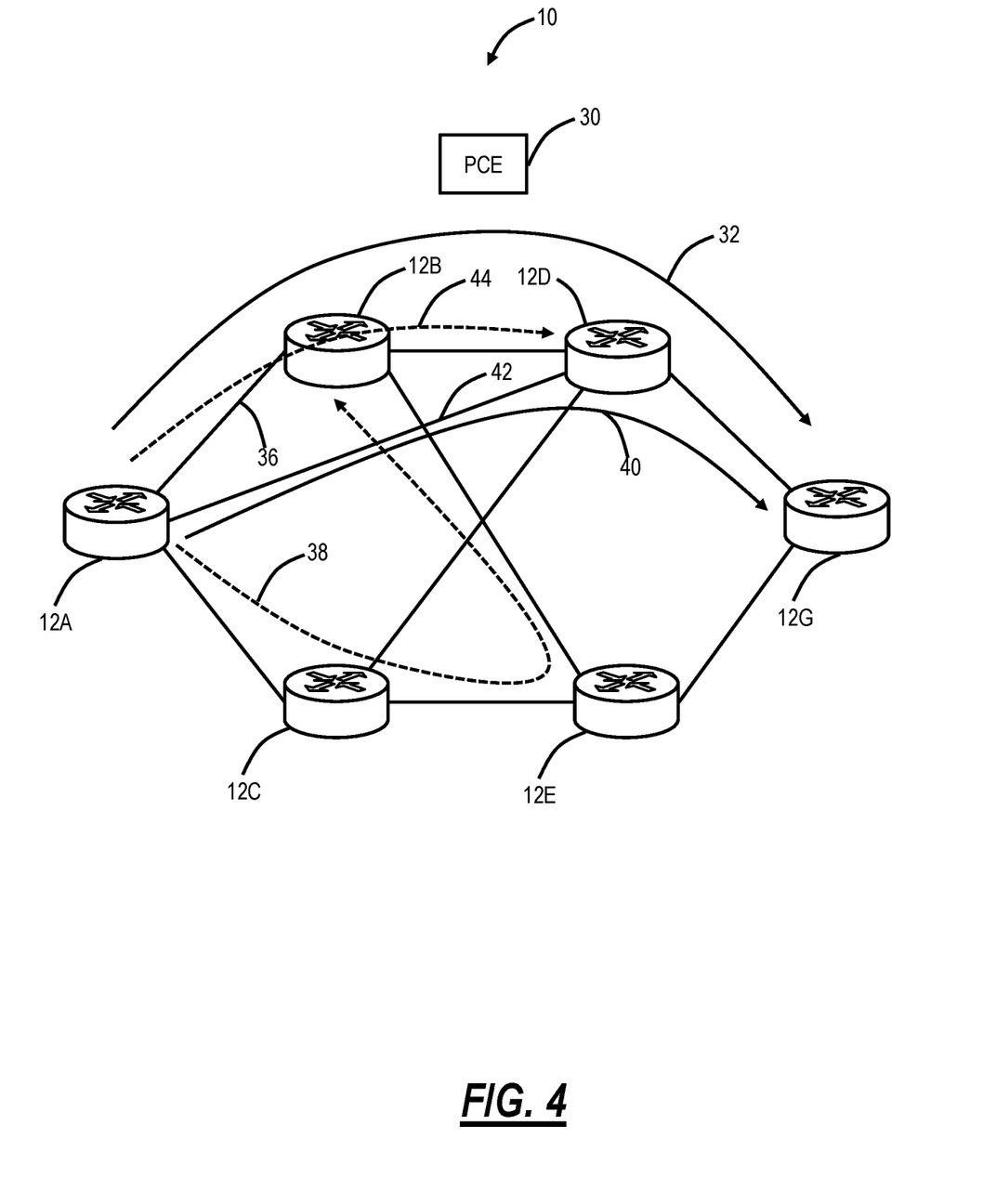
FIG. 4 is a network diagram of the SR network with various interconnected nodes for illustrating the use case of proper MSD Evaluation at SR-TE head-end.

FIG. 4 is a network diagram of the SR network 10 with various interconnected nodes 12 (labeled nodes 12A-12G) for illustrating the use case of proper MSD Evaluation at SR-TE head-end. In this example, in the absence of local protection information, the PCE 30 computes the path 32 between the nodes 12A, 12B, 12D, 12F. Here, the head-end node 12A needs to impose two SIDs, which is typically within its MSD limit.

However, a link 36 between the nodes 12A, 12B is protected by a backup path 38 between the nodes 12A, 12C, 12E, 12B. Thus, when the link 36 fails, the node 12A has to impose an additional two SIDs, which leads to a total number of four SIDs, which can exceed its MSD limit and hence traffic cannot be forwarded over the backup path 38 and hence will be dropped when the link 36 fails.

With the availability of local protection information at the head-end node 12A chooses a path 40 between the nodes 12A, 12D, 12F, which may be suboptimal to some criteria. After a failure of a link 42 between the nodes 12A, 12D, the node 12A only needs to impose one SID for a local backup path. Namely, the link 42 is protected by a backup path 44 between the nodes 12A, 12B, 12D which requires one additional SID. So, when the link 42 fails, the node 12A needs to push only two SIDs (which is within its MSD limit of 3) to steer the traffic via the backup path 44.

Use Case 3: Hierarchical SR-TE Paths

Figure 5:
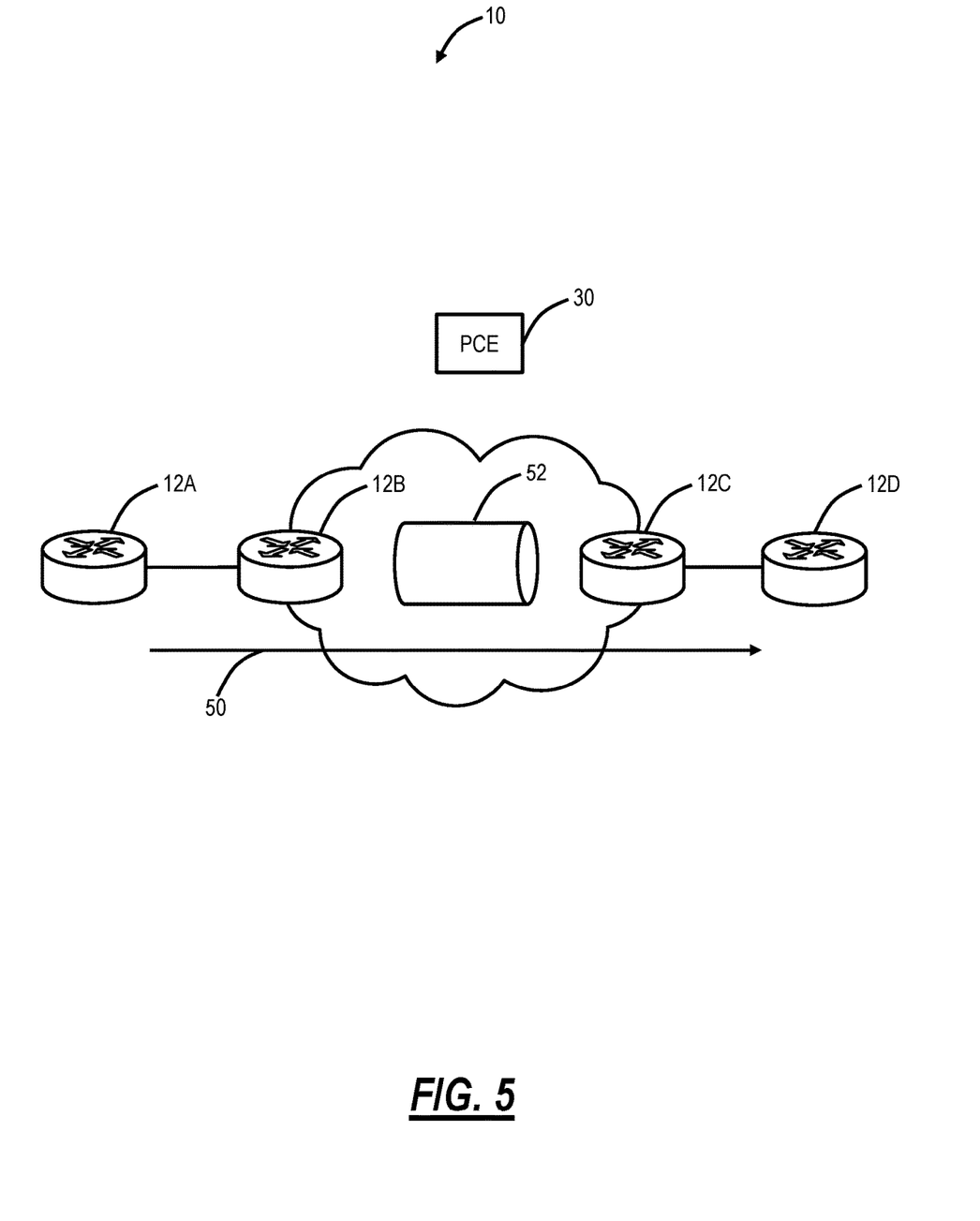
FIG. 5 is a network diagram of the SR network with various interconnected nodes for illustrating the use case of hierarchical SR-TE paths.

FIG. 5 is a network diagram of the SR network 10 with various interconnected nodes 12 (labeled nodes 12A-12D) for illustrating the use case of hierarchical SR-TE paths. Hierarchical SR-TE paths are used to alleviate the need for a head-end node 12A to impose a large label stack, particularly with low-cost access platforms whose MSD may be much restricted. The head-end node 12A of an overlay SR-TE path 50, between the nodes 12A, 12D, direct the packet to a head-end node 12B of an underlay (hierarchical) SR-TE path 52 using s Binding SID (BSID) which identifies underlay SR-TE paths in forwarding plane. Note, there can be other nodes in the underlay (hierarchical) SR-TE path 52, which are omitted for illustration purposes (and illustrated as a cloud). The underlay (hierarchical) SR-TE path 52 is typically computed by the PCE 30.

In the absence of local protection information for the head-end node 12B of the underlay SR-TE path 52, the PCE 30 may compute a path without taking into account the additional SID(s) required to be imposed during failure. As a result, during failure, traffic carried over all overlay SR-TE paths 50 placed over the underlay path 52 may be dropped. With the availability of local protection information, the PCE 30 can select a suitable head-end and underlay paths 52, which guarantee local protection during failure.

Use Case 4: Non-Intrusive Diagnostics of Local Backup Paths

Figure 6:
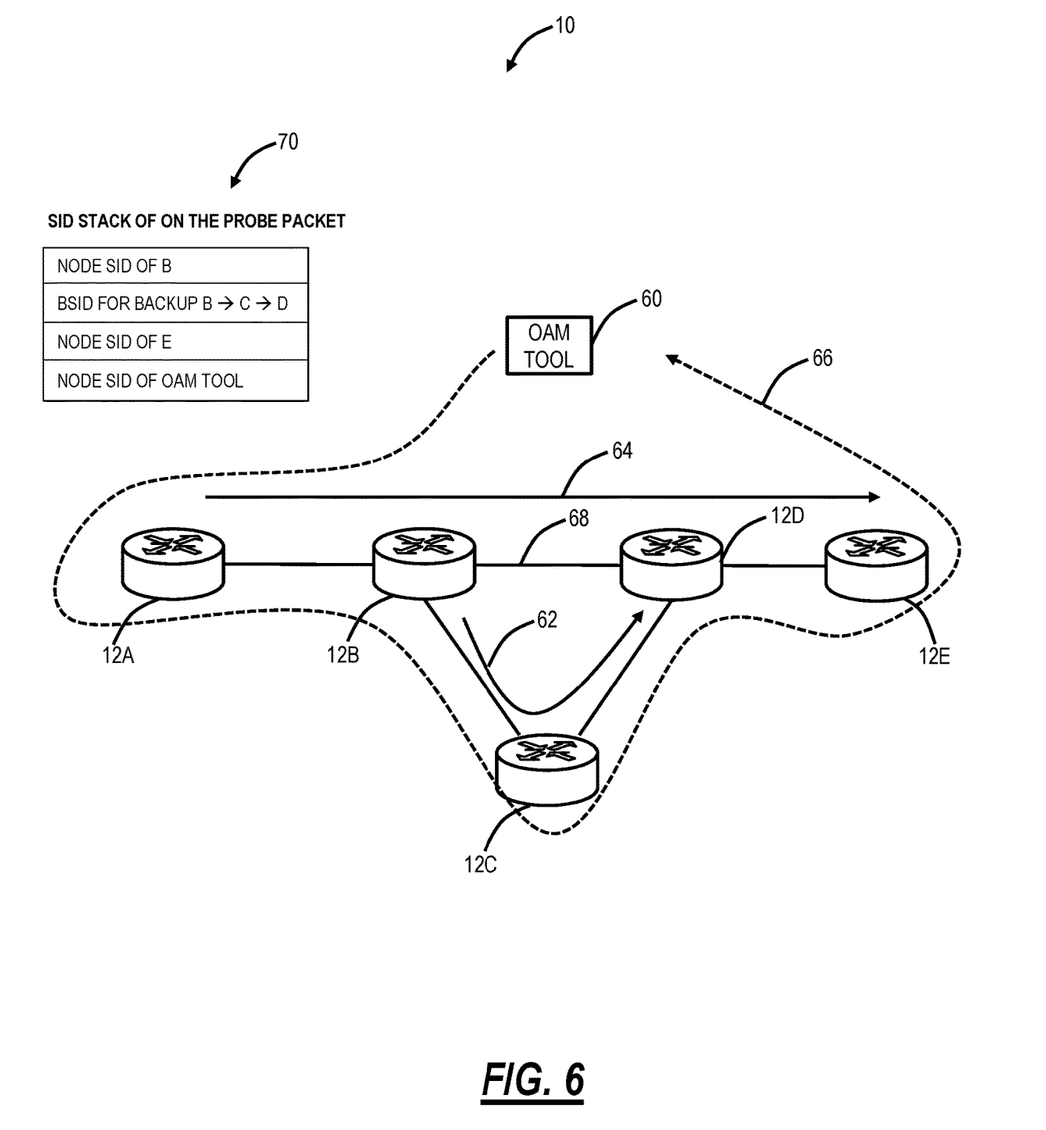
FIG. 6 is a network diagram of the SR network with various interconnected nodes for illustrating the use case of non-intrusive diagnostics of local backup paths.

FIG. 6 is a network diagram of the SR network 10 with various interconnected nodes 12 (labeled nodes 12A-12E) for illustrating the use case of non-intrusive diagnostics of local backup paths. With SR, an OAM tool 60 can formulate a SID list to steer a probe through one or more links(s)/node(s). The OAM tool 60 can formulate a SID list to test one or more backup paths 62 protecting link(s)/node(s) on an SR-TE path 64 by inserting appropriate BSID(s) on the SID list of the probe packet.

In the example of FIG. 6, the SID list is formulated to steer a probe packet 66 via the nodes 12A, 12B, 12C, 12D, 12E. A backup path 62 is between the nodes 12B, 12C, 12D protecting a link 68. The reception of the probe packet 66 by the OAM tool 60 indicates a healthy backup path 62 in the forwarding plane. In this example, only one backup path is probed. However, multiple backup paths can be simultaneously probed using a single probe packet 66. Also, in this example, the probe packet 66 can have a SID stack 70 of:

---
Node SID of node 12B
BSID of the backup path 62
Node SID of node 12E
Node SID of the OAM tool 60
---

Note, the payload of the probe packet 66 can be anything, and the key is that the OAM tool 60 knows the backup path 62 is healthy based on receiving the probe packet 66 from the node 12E.

Note, the OAM tool 60 can be at one of the nodes 12 as well as separate, having its own node SID for connectivity thereto.

Use Case 5: Intrusive Diagnostics of Backup

Also, the present disclosure can include activation of backup paths 62 in the forwarding plane for testing purposes. Using a new OAM message, the OAM tool 60 can instruct the node 12B to activate the backup path 62 protecting the link 68. Note that in this case, the probe packet 66 does not contain BSID of backup paths.

Example Node

Figure 7:
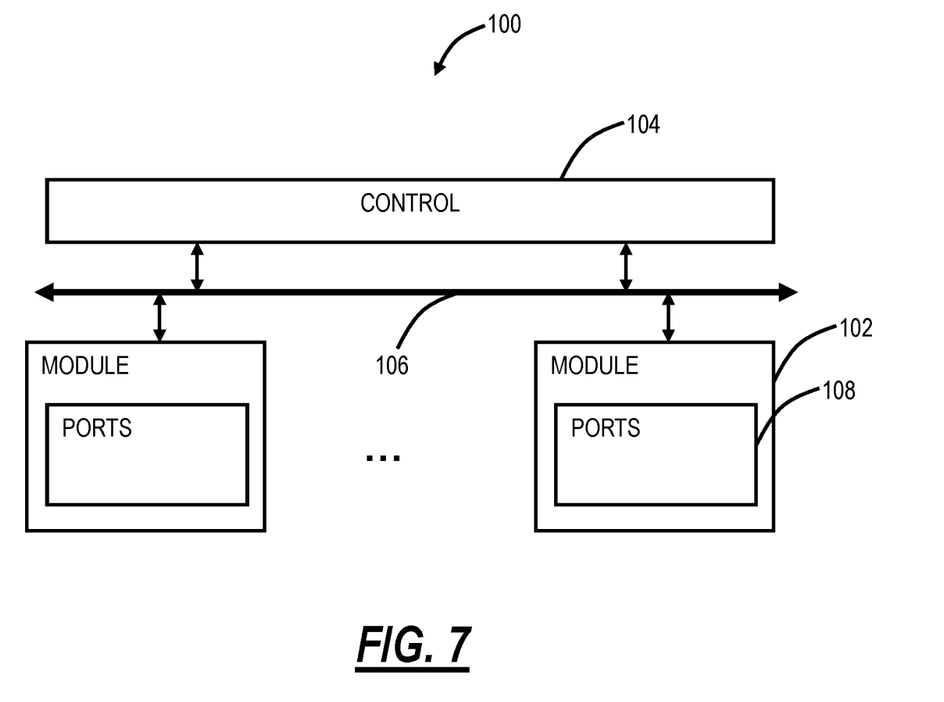
FIG. 7 is a block diagram of an example implementation of a node.

FIG. 7 is a block diagram of an example implementation of a node 12. Those of ordinary skill in the art will recognize FIG. 7 is a functional diagram in an oversimplified manner, and a practical embodiment may include additional components and suitably configured processing logic to support known or conventional operating features that are not described in detail herein. In an embodiment, the node 12 is a packet switch, but those of ordinary skill in the art will recognize the systems and methods described herein can operate with other types of network elements and other implementations that support SR networking. In this embodiment, the node 12 includes a plurality of modules 102, 104 interconnected via an interface 106. The modules 102, 104 are also known as blades, line cards, line modules, circuit packs, pluggable modules, etc. and generally refer to components mounted on a chassis, shelf, etc. of a data switching device, i.e., the node 12. Each of the modules 102, 104 can include numerous electronic devices and/or optical devices mounted on a circuit board along with various interconnects, including interfaces to the chassis, shelf, etc.

Two example modules are illustrated with line modules 102 and a control module 104. The line modules 102 include ports 108, such as a plurality of Ethernet ports. For example, the line module 102 can include a plurality of physical ports disposed on an exterior of the module 102 for receiving ingress/egress connections. Additionally, the line modules 102 can include switching components to form a switching fabric via the interface 106 between all of the ports 108, allowing data traffic to be switched/forwarded between the ports 108 on the various line modules 102. The switching fabric is a combination of hardware, software, firmware, etc. that moves data coming into the node 12 out by the correct port 108 to the next node 12. "Switching fabric" includes switching units in a node; integrated circuits contained in the switching units; and programming that allows switching paths to be controlled. Note, the switching fabric can be distributed on the modules 102, 104, in a separate module (not shown), integrated on the line module 102, or a combination thereof.

The control module 104 can include a microprocessor, memory, software, and a network interface. Specifically, the microprocessor, the memory, and the software can collectively control, configure, provision, monitor, etc. the node 12. The network interface may be utilized to communicate with an element manager, a network management system, etc. Additionally, the control module 104 can include a database that tracks and maintains provisioning, configuration, operational data, and the like.

Again, those of ordinary skill in the art will recognize the node 12 can include other components which are omitted for illustration purposes, and that the systems and methods described herein are contemplated for use with a plurality of different network elements with the node 12 presented as an example type of network element. For example, in another embodiment, the node 12 may include corresponding functionality in a distributed fashion. In a further embodiment, the chassis and modules may be a single integrated unit, namely a rack-mounted shelf where the functionality of the modules 102, 104 is built-in, i.e., a "pizza-box" configuration. That is, FIG. 7 is meant to provide a functional view, and those of ordinary skill in the art will recognize actual hardware implementations may vary.

Example Controller

Figure 8:
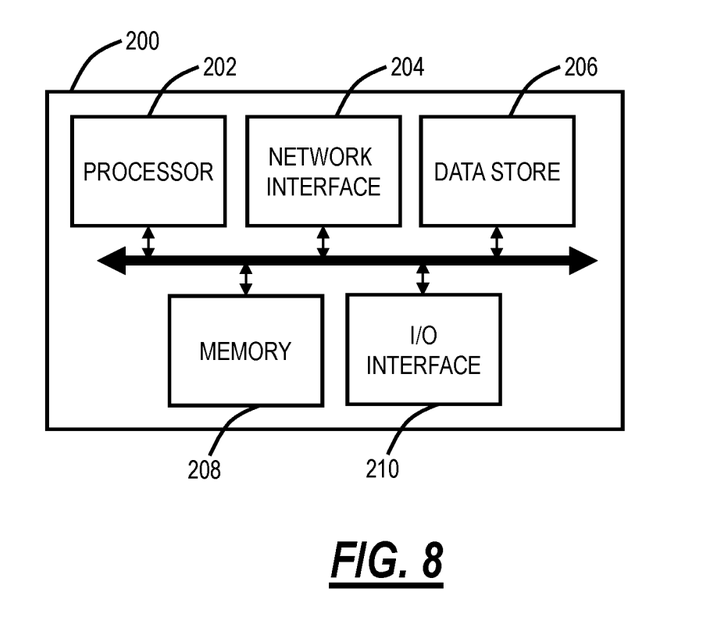
FIG. 8 is a block diagram of an example controller, which can form the control module for the node of FIG. 7, the OAM tool illustrated in the SR network, etc.

FIG. 8 is a block diagram of an example controller 200, which can form the control module 104 for the node 12, the OAM tool 60, etc. The controller 200 can be part of the node 12, or a stand-alone device communicatively coupled to the node 12. Also, the controller 200 can be referred to in implementations as a control module, a shelf controller, a shelf processor, a system controller, etc. The controller 200 can include a processor 202, which is a hardware device for executing software instructions. The processor 202 can be any custom made or commercially available processor, a central processing unit (CPU), an auxiliary processor among several processors associated with the controller 200, a semiconductor-based microprocessor (in the form of a microchip or chipset), or generally any device for executing software instructions. When the controller 200 is in operation, the processor 202 is configured to execute software stored within the memory, to communicate data to and from the memory, and to generally control operations of the controller 200 pursuant to the software instructions. The controller 200 can also include a network interface 204, a data store 206, memory 208, an I/O interface 210, and the like, all of which are communicatively coupled to one another and to the processor 202.

The network interface 204 can be used to enable the controller 200 to communicate on a data communication network, such as to communicate to a management system, to the nodes 12, 100, and the like. The network interface 204 can include, for example, an Ethernet module. The network interface 204 can include address, control, and/or data connections to enable appropriate communications on the network. The data store 206 can be used to store data, such as control plane information, provisioning data, Operations, Administration, Maintenance, and Provisioning (OAM&P) data, etc. The data store 206 can include any of volatile memory elements (e.g., random access memory (RAM, such as DRAM, SRAM, SDRAM, and the like)), nonvolatile memory elements (e.g., ROM, hard drive, flash drive, CDROM, and the like), and combinations thereof. Moreover, the data store 206 can incorporate electronic, magnetic, optical, and/or other types of storage media. The memory 208 can include any of volatile memory elements (e.g., random access memory (RAM, such as DRAM, SRAM, SDRAM, etc.)), nonvolatile memory elements (e.g., ROM, hard drive, flash drive, CDROM, etc.), and combinations thereof. Moreover, the memory 208 may incorporate electronic, magnetic, optical, and/or other types of storage media. Note that the memory 208 can have a distributed architecture, where various components are situated remotely from one another, but may be accessed by the processor 202. The I/O interface 210 includes components for the controller 200 to communicate with other devices.

It will be appreciated that some embodiments described herein may include or utilize one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field-Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured to," "logic configured to," etc. perform a set of operations, steps, methods, processes, algorithms, functions, techniques, etc. on digital and/or analog signals as described herein for the various embodiments.

Moreover, some embodiments may include a non-transitory computer-readable medium having instructions stored thereon for programming a computer, server, appliance, device, processor, circuit, etc. to perform functions as described and claimed herein. Examples of such non-transitory computer-readable medium include, but are not limited to, a hard disk, an optical storage device, a magnetic storage device, a Read-Only Memory (ROM), a Programmable ROM (PROM), an Erasable PROM (EPROM), an Electrically EPROM (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A non-transitory computer-readable medium having instructions stored thereon for programming a device to perform steps of:
    obtaining advertisement information from a plurality of nodes in a Segment Routing network, wherein the advertisement information relates to local protection at a corresponding node and includes i) addresses for links and/or nodes in the local protection, and ii) a type of the local protection with the local protection being addressed locally at the corresponding node instead of via a head-end node or Path Computation Element (PCE), wherein the local protection utilizes a Binding Segment Identifier (SID) for each local backup path;
    storing the advertisement information locally at the head-end node or PCE; and
    computing a path in the Segment Routing network, by the head-end node or PCE, based in part on available local protection on the path at associated remote nodes utilizing the stored advertisement information, wherein the head-end or PCE computes the path such that one or more nodes of the plurality of nodes have a guarantee of the local protection.

2. The non-transitory computer-readable medium of claim 1, wherein the steps further include probing a local backup path utilizing the stored advertisement information including the Binding SID for the local backup path.

3. The non-transitory computer-readable medium of claim 1, wherein the advertisement information is obtained via one of an Interior Gateway Protocol and Border Gateway Protocol Link-State advertisement.

4. The non-transitory computer-readable medium of claim 1, wherein the advertisement information is obtained via Path Computation Element Protocol.

5. The non-transitory computer-readable medium of claim 1, wherein the path is computed to satisfy Maximum Segment Depth (MSD) value constraints at a head-end node.

6. The non-transitory computer-readable medium of claim 1, wherein the path is computed in part based on having one of a maximum number of local backup paths and a maximum degree of guaranteed local protection.

7. The non-transitory computer-readable medium of claim 1, wherein the steps further include
sending a message to a head-end node of an underlay path to instruct the head-end node to activate a local backup path.

8. The non-transitory computer-readable medium of claim 1, wherein the path is computed with a guaranteed local protection at the associated remote nodes.

9. A node comprising:
a plurality of ports;
a switching fabric configured to interconnect the plurality of ports; and
a controller,
wherein the node is configured to
obtain, via the plurality of ports, advertisement information from a plurality of nodes in a Segment Routing network, wherein the advertisement information relates to local protection at a corresponding node and includes i) addresses for links and/or nodes in the local protection with the local protection being addressed locally at the corresponding node instead of via the node or Path Computation Element (PCE), and ii) a type of the local protection, wherein the local protection is based on a Binding Segment Identifier (SID) for each local backup path in the local protection;
store, via the controller, the advertisement information at the node; and
compute, via the controller, a path in the Segment Routing network, at the node, based in part on available local protection on the path at associated remote nodes utilizing the stored advertisement information, wherein the node or PCE computes the path such that one or more nodes of the plurality of nodes have a guarantee of the local protection.

10. The node of claim 9, wherein the node is further configured to
probe a local backup path utilizing the stored advertisement information including the Binding SID for the local backup path.

11. The node of claim 9, wherein the advertisement information is obtained via one of an Interior Gateway Protocol, Border Gateway Protocol Link-State advertisement, and Path Computation Element Protocol.

12. The node of claim 9, wherein the path is computed to satisfy Maximum Segment Depth (MSD) value constraints at a head-end node.

13. The node of claim 9, wherein the path is computed in part based on having one of a maximum number of local backup paths and a maximum degree of guaranteed local protection.

14. The node of claim 9, wherein the path is computed with a guaranteed local protection at the associated remote nodes.

15. A method comprising
obtaining advertisement information from a plurality of nodes in a Segment Routing network, wherein the advertisement information relates to local protection at a corresponding node and includes i) addresses for links and/or nodes in the local protection, and ii) a type of the local protection with the local protection being addressed locally at the corresponding node instead of via a head-end node or Path Computation Element (PCE), wherein the local protection utilizes a Binding Segment Identifier (SID) for each local backup path;
storing the advertisement information locally at the head-end node or PCE; and
computing a path in the Segment Routing network, by the head-end node or PCE based in part on available local protection on the path at associated remote nodes utilizing the stored advertisement information, wherein the head-end node or PCE computes the path such that one or more nodes of the plurality of nodes have a guarantee of the local protection.

16. The method of claim 15, further comprising
probing a local backup path utilizing the stored advertisement information including the Binding SID for the local backup path.

17. The method of claim 15, wherein the advertisement information is obtained via one of an Interior Gateway Protocol, Border Gateway Protocol Link-State advertisement, and Path Computation Element Protocol.

18. The method of claim 15, wherein the path is computed to satisfy Maximum Segment Depth (MSD) value constraints at a head-end node.

19. The method of claim 15, wherein the path is computed in part based on having one of a maximum number of local backup paths and a maximum degree of guaranteed local protection.

20. The method of claim 15, wherein the path is computed with a guaranteed local protection at the associated remote nodes.

* * * * *